United States Patent [19]

Bancroft

[11] Patent Number: 4,662,970

[45] Date of Patent: May 5, 1987

[54] PADS AND THEIR FORMATION

[75] Inventor: Peter Bancroft, Cheltenham, Australia

[73] Assignee: Banson Nominees Pty. Ltd., Cheltenham, Australia

[21] Appl. No.: 726,024

[22] Filed: Apr. 23, 1985

[30] Foreign Application Priority Data

Apr. 30, 1984 [AU] Australia ............................. PG4753

[51] Int. Cl.[4] ............................................ B32B 1/00

[52] U.S. Cl. ..................................... 156/256; 83/302; 156/264; 156/259; 156/512; 156/523; 156/574; 156/576

[58] Field of Search .......................... 83/302, 292–293, 83/335; 242/75.4, 57.1; 156/256, 259, 263, 264, 265, 271, 510, 512, 523, 574, 577, 576, 554; 282/DIG. 2, 22 R; 206/554, 460, 813

[56] References Cited

U.S. PATENT DOCUMENTS

| | | | |
|---|---|---|---|
| 3,197,200 | 7/1965 | Byrt | 271/3 |
| 3,272,043 | 9/1966 | Ryan | 83/355 X |
| 3,671,362 | 6/1972 | Pierce et al. | 156/523 X |
| 3,729,190 | 4/1973 | Harris et al. | 271/85 |
| 3,810,805 | 5/1974 | Goldsworthy et al. | 156/361 |
| 3,939,034 | 2/1976 | Tanaka et al. | 156/523 X |
| 4,105,224 | 8/1978 | Rodebaugh | 206/460 X |
| 4,134,558 | 1/1979 | Grillo | 242/75.4 X |
| 4,147,380 | 4/1979 | Nelson | 156/259 X |
| 4,294,145 | 10/1981 | Bodewein | 83/302 |
| 4,381,107 | 4/1983 | Armiger | 270/58 |
| 4,451,249 | 5/1984 | Debin | 493/204 |
| 4,522,679 | 6/1985 | Funakoshi et al. | 156/576 X |

FOREIGN PATENT DOCUMENTS 2728426 1/1979 Fed. Rep. of Germany .

*Primary Examiner*—David Simmons

*Attorney, Agent, or Firm*—Merchant, Gould, Smith, Edell, Welter & Schmidt

[57] ABSTRACT

A method and apparatus for forming discrete length strip members each composed of a plurality of laterally interconnected items, and collating those strip members into a plurality of pads of items. A supply source of elongate material is supported by support means and fed along a feed path past longitudinal and transverse cutting means which, respectively, progressively longitudinally cut the elongate material into a plurality of material strips, and intermittently transversely cut the material strips into the strip members. Strip member feed means intermittently feeds the strip members onto a work surface with successive feedings being superimposed on preceding feedings. Following each feeding, a carriage moves over the work surface carrying a supply source of self-adhesive tape which is fed from the supply source and laid in a relaxed condition along, but laterally overlapping from, an edge portion of each strip member. The overlapped tape on successive strip members adheres to the tape on the immediately preceding strip member so as to interconnect adjacent strip members together.

59 Claims, 11 Drawing Figures

PADS AND THEIR FORMATION

This invention relates generally to pads having a plurality of items interconnected along an edge portion thereof with self-adhesive tape, and also to a method and apparatus for the provision of such pads. In particular, the invention is concerned with a method and apparatus for providing discrete length strip members each composed of a plurality of laterally interconnected items from a supply source of elongated material, and also for collating those strip members into pads of items. The pads may be paper item pads such as paper note pads or plastic item pads such as plastic bag or envelope pads, and it will be convenient to hereinafter describe the invention in relation to such applications. However, it is to be appreciated that those applications are merely exemplary.

When using a pad of items such as paper or plastic sheets or bags, it is sometimes desirable to tear one item from the pad and attach it in a prominent position on an article or structure. Thus, for example, an information or message bearing sheet from a paper note pad may be attached to a telephone or notice board, or a plastic bag from a pad of bags may be used to contain an object and be attached to a notice board or vehicle windscreen. Various modes of attaching the items have been utilised including pins, staples, and self-adhesive tape. It has been found with pads commonly used for such purposes, however, that the means of attachment are usually separate from the items and sometimes not conveniently available when it is desired to use them with those items. Additionally, separate means of fastening are commonly used to hold the items in a pad form to that used in attaching the items to an article or structure.

An object of the present invention is the provision of a relatively simple and inexpensive method and apparatus for forming discrete length strip members.

A further object of the present invention is the provision of a method and apparatus for forming discrete length strip members each composed of a plurality of laterally interconnected items, and collating the strip members into a plurality of pads of items.

Another object of the present invention is the provision of an inexpensive pad of items, when formed using the method and apparatus of the present invention.

According to one aspect of the present invention, there is provided a method for forming discrete length strip members, comprising:

feeding elongate material from a supply source along a feed path past longitudinal cutting means and transverse cutting means;

progressively longitudinally cutting the passing elongate material into a plurality of material strips with the longitudinal cutting means; and, intermittently transversely cutting the passing elongate material strips with the transverse cutting means thereby to form the strip members.

According to another aspect of the present invention, there is provided a method for forming discrete length strip members each composed of a plurality of laterally interconnected items, and collating the strip members into a plurality of pads of items, comprising:

feeding elongate material from a supply source along a feed path past longitudinal cutting means and transverse cutting means;

progressively longitudinally cutting the passing elongate material into a plurality of material strips with the longitudinal cutting means;

intermittently transversely cutting the passing elongate material strips with the transverse cutting means thereby to form the strip members;

intermittently feeding the strip members onto a work surface, each feeding positioning at least one strip member onto the work surface, and the or each strip member of each successive feeding being superimposed on the or a respective strip member of the immediately preceding feeding;

and, subsequent to each feeding:

(i) feeding self-adhesive tape from a tape supply source;

(ii) substantially relaxing tape fed from the tape supply source;

(iii) presenting the relaxed tape to an edge portion of the or each strip member positioned on the work surface, during the immediately preceding feeding, such that a portion of the relaxed tape overlaps the edge portion of the or each strip member; and, (iv) laying the presented tape on the edge portion of the or each strip member so that the presented tape adheres thereto, the laterally overlapping portion of the presented tape laid on successive strip members adhering to the overlapping portion of tape laid on the immediately preceding strip member thereby to interconnect adjacent superimposed strip members.

According to yet another aspect of the present invention, there is provided apparatus for forming discrete length strip members, comprising:

support means for a supply source of elongate material from which the strip members are formed;

longitudinal cutting means operable to progressively longitudinally cut the elongate material into a plurality of material strips;

transverse cutting means operable to intermittently transversely cut the elongate material strips thereby to form the strip members; and, feed means for feeding the elongate material longitudinally from the supply source along a feed path passing the longitudinal cutting means for cutting into the material strips, and passing the transverse cutting means for cutting the material strips into the strip members.

According to a further aspect of the present invention, there is provided apparatus for forming discrete length strip members each composed of a plurality of laterally interconnected items, and collating the strip members into a plurality of pads of items, comprising:

support means for a supply source of elongate material from which the strip members are formed;

longitudinal cutting means operable to progressively longitudinally cut the elongate material into a plurality of material strips;

transverse cutting means operable to intermittently transversely cut the elongate material strips thereby to form the strip members;

feed means for feeding the elongate material longitudinally from the supply source along a feed path passing the longitudinal cutting means for cutting into material strips, and passing the transverse cutting means for cutting the material strips into the strip members;

a work surface for receiving strip members thereon;

strip member feed means for intermittently feeding strip members onto the work surface, each strip member feeding positioning at least one strip member onto the work surface, and the or each strip member of each successive feeding being superimposed on the or a respective strip member of the immediately preceding feeding;

a carriage mounted for linear movement over the work surface, the carriage movable subsequent to each strip member feeding in a direction parallel to an edge portion of the or each strip member positioned on the work surface;

a supply source of self-adhesive tape mounted on the carriage;

tape feed means mounted on the carriage and operable during carriage movement subsequent to each strip member feeding to feed self-adhesive tape from the tape supply source and present it to the edge portion of the or each strip member, positioned on the work surface during the immediately preceding strip member feeding, in a substantially relaxed condition and such that a portion of the tape overlaps the edge portion of the or each strip member; and, tape applicator means mounted on the carriage for laying the presented tape on the edge portion of the or each strip member so that the tape adheres thereto, the overlapping portion of tape laid on successive strip members adhering to the laterally overlapping portion of tape laid on the immediately preceding strip member thereby to interconnect adjacent superimposed strip members.

Preferably, the supply source of elongate material is in roll form. That is a convenient form in which to handle the material and permits economical use of space in which to store the supply source. To that end, the support means is preferably arranged to rotatably support the roll of material so that material may be drawn therefrom. The support means preferably extends through an axial bore in the roll of material to support same. An elongate support member having opposed end portions is preferably provided for that purpose. The support means preferably also includes a pair of bearing members each mounted on a respective one of the frame members and each rotatably supporting a respective support member end portion. The bearing members are preferably constructed so as to facilitate removal of the support member therefrom for mounting of a roll of material thereon.

In order to axially locate a roll of material on the support member and minimise relative axial movement between the support member and roll, the support means preferably further includes one or more retention elements. There are preferably two such retention elements and they are preferably removably secured to the support member. The construction and arrangement is preferably such that, in use, each retention element abuts a respective end region of the roll of material on the support member.

The support means preferably also includes a brake mechanism to regulate the free rotation of the material roll and thereby alleviate the possibility of the speed at which the material leaves the roll exceeding the speed at which it is fed through the apparatus. The brake mechanism preferably acts on the support member and is preferably adjustable to set and maintain a predetermined frictional drag force on that support member.

The support means preferably also includes an adjustment mechanism operable to axially move the support member, and thus the material roll thereon, so as to shift the supply source for alignment of the elongate material with the cutting means, and thereafter maintain that alignment. The adjustment mechanism preferably includes an adjustment member mounted on the frame, and a connecting member interconnecting the adjustment member and the support member. Preferably, the adjustment member is operable to move the connecting member relative to the frame, the support member being moved with the connecting member.

The longitudinal cutting means preferably includes at least one pair of longitudinal cutting elements located adjacent the feed path. In the example application of the apparatus, there is preferably only one cutting element pair which cuts the material into two material strips. It will be appreciated, however, that additional cutting element pairs may be provided. Preferably, the cutting means also includes mounting means to mount the longitudinal cutting elements to the frame.

Preferably, the cutting means has a pair of longitudinal cutting elements which are cooperative cutting blades. Those blades are preferably arranged so that the material is cut as it passes therebetween. The longitudinal cutting blades may be disc-shaped with peripheral cutting edges. Those blades may be mounted parallel to each other with the cutting edges generally overlapping. In this way, the materal may be cut with a shearing like action as it passes therebetween. At least one of the longitudinal cutting blades may be mounted for rotation about its central axis. In addition, one or both of the blades may be rotatably driven to facilitate cutting of the material, the other blade being freely rotatable. As will be described more fully hereinafter, drive means may be provided for this purpose.

The transverse cutting means preferably includes a pair of transverse cutting elements located adjacent the feed path. Preferably, the transverse cutting means also includes actuating means operable to cause the cutting element to cut the material strips.

Preferably, the transverse cutting means has pair of transverse cutting elements which are cooperative cutting blades. Those blades are preferably arranged so that the material passes therebetween and the blades intermittently act to transversely cut the material. The blades preferably act to simultaneously cut the material across its complete width. The transverse cutting blades are preferably elongated and extend the width of the sheet material. Each transverse cutting blade preferably has a longitudinally extending cutting edge.

The transverse cutting blades may be mounted for relative movement. One blade may be fixedly mounted and the other blade mounted for movement of the cutting edge thereof toward and away from the fixed blade cutting edge. The movable transverse cutting blade may be rotatable about its longitudinal axis to move the cutting edge thereof toward and away from the fixed transverse cutting blade cutting edge.

Preferably, the feed means includes a draw unit to draw the material from the supply source. Preferably, the feed means also includes a guide unit to guide the drawn material through the longitudinal and transverse cutting means and subsequently out of the apparatus. That guide unit may also act to keep the drawn material taut during cutting.

The draw unit is preferably stationed between the longitudinal and transverse cutting means so that, in effect, it draws the material through the longitudinal cutting means and then pushes the material strips through the transverse cutting means.

The guide unit preferably includes at least one guide element stationed between the material supply source and the longitudinal cutting means to align the drawn material with, and guide that material through, the longitudinal cutting means. The guide unit may also include at least one presentation element stationed downstream of the transverse cutting means to present the material strips for subsequent collation.

The draw unit may include a set of draw rollers between which the elongate material passes in contact. The draw rollers may include a drive roller, which does the actual drawing of the elongate material by frictionally gripping the material. As will be described more fully hereinafter, drive means may be provided to drive the drive roller.

The guide elements may include at least one guide roller. There may be a plurality of such rollers about which the material passes to ensure correct alignment with the longitudinal cutting blades. One of the guide rollers may be a jockey roller, movable to take up any slack in the drawn material. There may be two guide rollers, one of which is the jockey guide roller. The presentation element may include a presentation plate over which the material strip members slide after passing through the transverse cutting means.

As previously mentioned the apparatus may be provided with drive means for one of the longitudinal and transverse cutting blades, and the drive roller. A single drive means may be suitable for driving all components.

In collating the cut strip members, the relaxed tape is preferably presented to an edge portion of the or each strip member positioned on the work surface such that, when laid, the tape extends along and laterally overlaps the edge portion of the or each strip member along the entire length of the edge portion thereof. Preferably, the relaxed tape is progressively presented to and laid along the edge portion of the or each strip member from one end to the other end thereof. Moreover, preferably, the tape is fed from the tape supply source and relaxed substantially continuously during presentation and laying thereof. The tape is preferably fed from the tape supply source by drawing tape therefrom, and the fed tape is relaxed by drawing it from the tape supply source at a rate which is faster than that at which it is presented to the edge portion of the or each strip member for laying thereby creating a reserve of drawn tape, tape in the reserve of drawn tape having time to substantially relax prior to being presented for laying.

Preferably, drawing of tape from the tape supply source is ceased prior to completion of tape laying along the edge portion of the strip member, completion of tape laying reducing the reserve of drawn tape.

Preferably, the tape feed means progressively presents the tape to, and the tape applicator progressively lays the tape along, the edge portion of the or each strip member as the carriage moves over the work surface subsequent to each strip member feed. Preferably, the tape feed means feeds tape from the tape supply source and relaxes the feed tape substantially continuously during presentation and laying of the tape. The tape feed means preferably includes tape prestripping means operable to draw feed tape from the tape supply source at a rate which is faster than that at which it is presented to the strip members, thereby creating the reserve of drawn tape, tape in the reserve of drawn tape substantially relaxing prior to the tape feed means presenting it for laying on the strip members. The tape prestripping means is preferably operable to draw feed tape during a major portion of the carriage movement subsequent to each strip member feed and is inoperable to draw feed tape during the remaining minor portion of the carriage movement subsequent to each strip member feed, the tape feed means during inoperation of the tape prestripping means continuing to present the reserve of tape for laying on the strip members thereby reducing the amount of reserve of drawn tape. The tape prestripping means preferably includes at least one draw roller operative to draw feed tape from the tape supply source, and the tape feed means also preferably includes tape up means having at least one idler roller arranged to supportingly receive tape from the draw roller and about which the reserve of drawn tape is created.

Preferably, each strip member feeding positions at least one pair of the strip members on the work surface, the strip members of the or each pair being positioned with their respective edge portions parallel to and closely spaced apart from each other. The relaxed tape is, preferably, presented such that it extends between the edge portions of the or each pair of strip members whereby, on laying, the presented tape interconnects the strip members of the or each pair of strip members positioned on the work surface during the immediately preceding strip member feeding thereby to substantially simultaneously form a plurality of integrally connected pads.

Preferably, the laid tape is longitudinally severed intermediate the edge portions of the or each pair of strip members thereby separating the pairs of strip members.

Preferably, the presented tape is laid on the edge portion of the or each strip member by brushing the tape thereon.

Preferably, the tape feed means includes tape presentation means positioned immediately above the tape portion of the strip members during the carriage movement subsequent to each strip member feed and arranged to receive the substantially relaxed tape and present it to the edge portion of the strip members, such that when laid the tape laterally overlaps the edge portion of the strip members along the entire length of the edge portion of the strip members.

Preferably, the tape applicator means is a brush-type applicator operable to brush the tape presented to the edge portion of the strip members into adherence therewith.

Preferably, subsequent to each strip member feeding, the strip members positioned on the work surface thereto during laying of the presented tape are releasably fixed, the strip members being slightly tensioned on fixing thereby to minimise undesired movement thereof.

Preferably, the tape fed from the tape supply source has a leading end portion, and subsequent to each strip member feeding, the leading end portion is fixed prior to laying the presented tape relative to the strip member, the relaxed tape being progressively presented and laid in a direction leading away from the fixed leading end portion. Preferably, the leading end portion is fixed remote from the strip members, and the leading end portion is severed from the tape laid on the strip members.

Preferably, prior to feeding strip members onto the work surface, at least one pad backing member is fed from a backing member supply source onto the work surface, feeding tape from the tape supply source, tape fed from the tape supply source is substantially relaxed, the relaxed tape is presented to an edge portion of the backing member positioned on the work surface and the presented tape is laid along the edge portion of the backing member, the strip members subsequently fed onto the work surface being superimposed on the backing members with the overlapping portion of tape laid on the strip members immediately succeeding the backing member adhering to the tape laid on the backing member.

Preferably, the strip member feed means is mounted on the carriage for movement therewith, the carriage being intermittently movable from adjacent the cutting means to the work surface, during which movement the strip member feed means is operable to releasably engage strip members as they are formed to draw feed them onto the work surface. Preferably, the strip member feed means includes at least one pair of pick up units operable, at each feed, to simultaneously releasably engage and feed a respective pair of the strip members on the work surface, the pick up units positioning the or each pair of strip members with their respective edge portions parallel to and closely spaced apart from each other, and the tape feed means is operable to present the tape such that it extends between the edge portions of the or each pair of strip members whereby, on laying, the presented tape interconnects the strip members of the or each pair positioned on the work surface during the immediately preceding strip member feed thereby to substantially simultaneously form a plurality of integrally connected pads.

Preferably, the apparatus further includes releasable tape clamp means positioned adjacent the work surface and operable, subsequent to each strip member feed, and prior to laying the presented tape, to clamp the leading end portion relative to the work surface, the relaxed tape being progressively presented and laid in a direction leading away from the clamped leading end portion. The apparatus preferably further includes tape severing means operable to sever the leading end portion from tape laid on the strip members and operable to sever the tape laid on the strip members from the tape supply source thereby forming a fresh leading end portion.

Preferably, the apparatus further includes releasable clamp means, operable subsequent to each strip member feed to clamp the strip members positioned on the work surface thereto, during laying of the presented tape, the clamp means slightly tensioning the strip members positioned on the work surface.

Preferably, the work surface has at least one rib formed thereon against which the edge portion of the strip members on the work surface abuts thereby to raise the edge portions relative to the remainder of the strip members to facilitate laying of the presented tape thereon. Moreover, preferably, the work surface has location means formed thereon for locating the strip members on the work surface such that the edge portions thereof abut against the rib.

The following description refers to a preferred embodiment of the method and apparatus of the present invention. To facilitate an understanding of the invention, reference is made in the description to the accompanying drawings where the apparatus is illustrated in that preferred embodiment. It is to be understood that the method and apparatus of the present invention is not limited to the preferred embodiment as hereinafter described and illustrated in the drawings.

Figure 1:
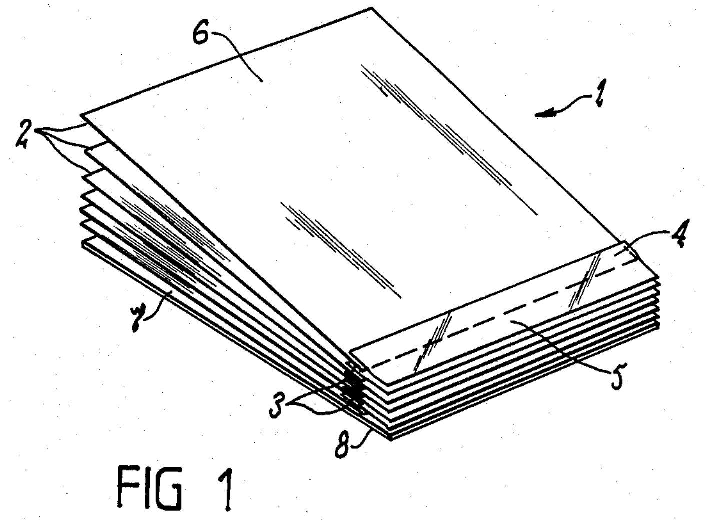
FIG. 1 is a perspective view of a pad formed using a method and apparatus of the present invention.
Figure 5:
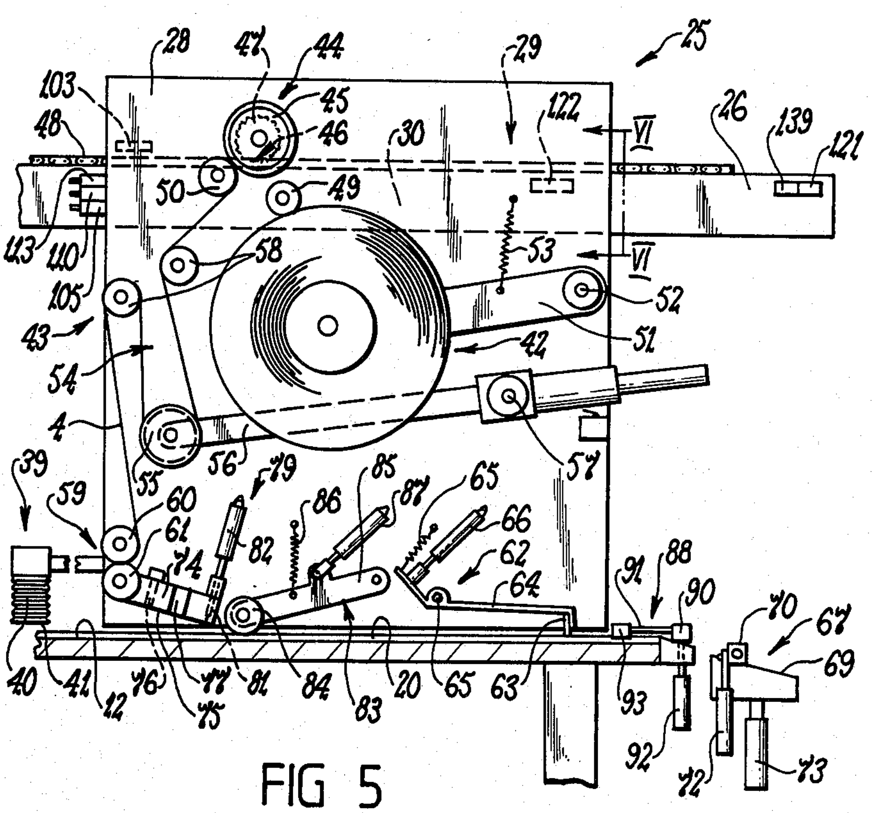
FIG. 5 is a detailed partial front elevational view of the apparatus of FIG. 2.
Figure 2:
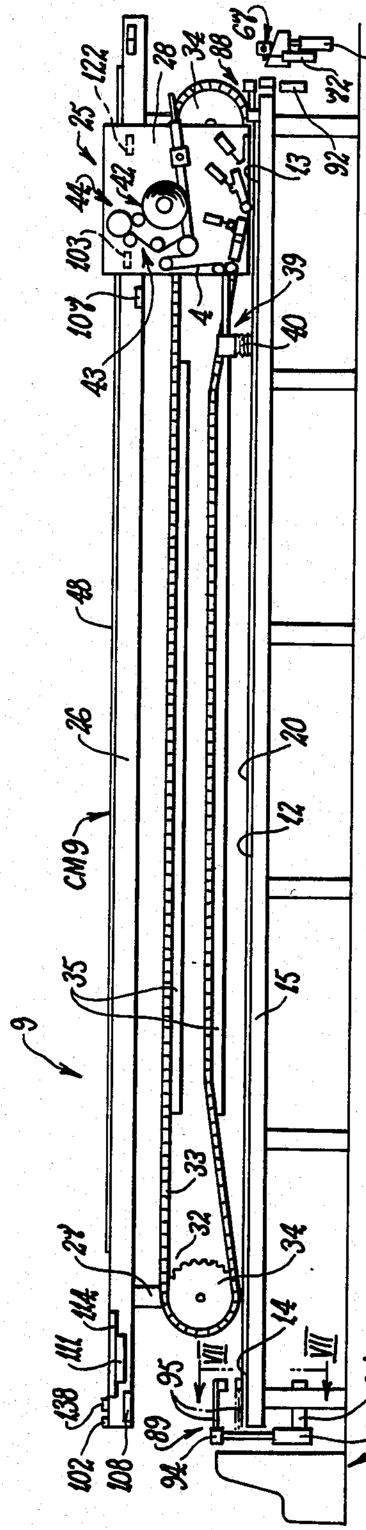
FIG. 2 is a front elevational view of apparatus for forming the pad of FIG. 1.
Figure 3:
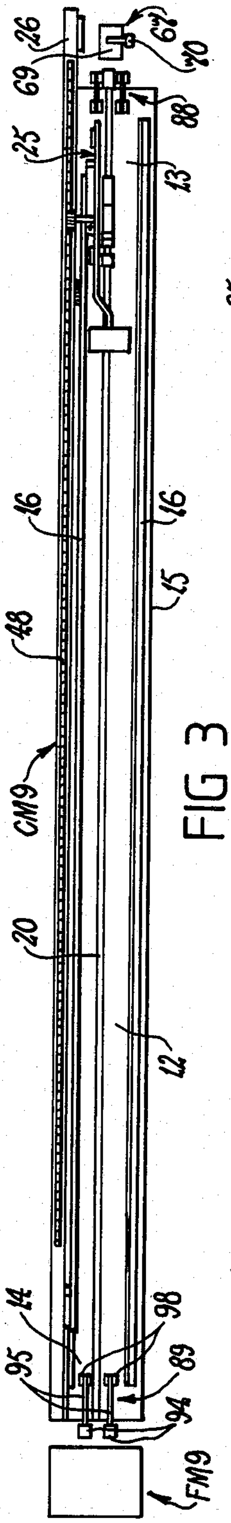
FIG. 3 is a plan view of the apparatus of FIG. 2.

Referring to FIG. 1, there is shown pad 1, having a plurality of sheet items 2, such as paper sheets each having edge portion 3. A strip of self-adhesive tape 4, is adhered to each sheet 2, along edge portion 3. Each strip of tape 4, has portion 5, thereof overlapping its respective edge portion 3, and removably adhering to overlapping portion 5, of immediately adjacent strip of tape 4. With such an arrangement each sheet 2, and strip of tape 4, adhered thereto can be removed from pad 1, and subsequently adhered to an object.

Adhesive tape 4, is adhered to upper face 6, of each sheet 2, and tape 4, laid along top edge portion of each sheet 2. Self-adhesive tape 4, is of the kind including a flexible carrier strip on which an adhesive gum is carried. The adhesive gum is on one side of the carrier strip only. The carrier strip is conveniently transparent.

Pad 1, includes pad backing member 7, upon which sheets 2, are compiled. In the case of paper sheets, backing member 7, is composed of stiff cardboard. A strip of adhesive tape 4, is adhered to the upper face of backing member 7, adjacent top edge 8, thereof. The overlapping portion 5, of lowermost adhesive tape strip 4, is then adhered to that strip, thereby permitting removal of the lowermost sheet 2, without destroying the adhesiveness of its strip of tape 4.

Turning generally now to FIGS. 2 to 11, there is shown apparatus 9, for forming pads 1. For economy of operation apparatus 9, is adapted to simultaneously form a plurality of integrally connected pads 1, (hereinafter termed "a pad block"), the block subsequently being divided into pads by suitable severing means such as a guilotine. With this arrangement corresponding sheets 2, of a number of pads 1, in a pad block are constituted by strip member 10, and edge portions 3, of sheets 2, of each strip member 10, together form edge portion 11, of strip member 10. Apparatus 9, broadly includes strip member forming machine FM9, for forming strip members 10, and strip member collating machine CM9, for collating those strip members 10, into pads 1, with control circuit CC9, for generally controlling operation of machines FM9, and CM9.

Referring initially to FIGS. 2 to 8, machine CM9, is specifically illustrated and includes work surface 12, arranged to receive strip members 10, thereon from machine FM9. Work surface 12, is substantially flat and elongated, opposed ends hereinafter termed "head" and "tail" ends 13,14, respectively. Work surface 12, is provided by work table 15.

Work surface 12, is arranged to receive pairs of strip members 10, thereon, the members of each pair being positioned on work surface 12, in parallel spaced apart relation to each other. Strip member 10, is positioned so as to extend between head and tail ends 13,14.

Work surface 12, has a pair of parallel spaced apart location shoulders 16, thereon for guiding and locating strip members 10, on work surface 12. The remotely spaced longitudinal edges of a pair of strip members 10, abut a respective locating shoulder 16. Those locating shoulders 16, extend the length of work surface 12, and are adjustably laterally of their extent to accommodate various widths of strip members 10.

Figure 7:
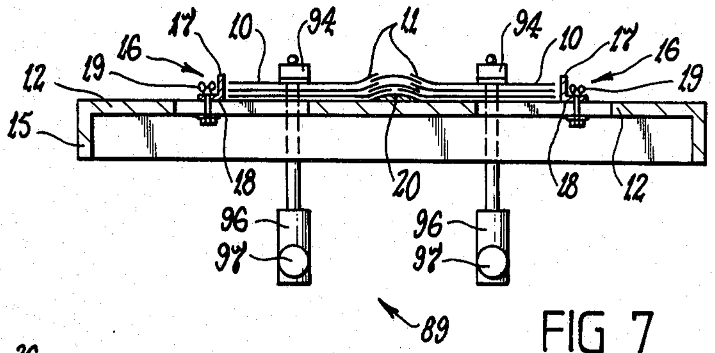
FIG. 7 is a cross-sectional view taken through line VI—VI of the apparatus of FIG. 2.
Figure 6:
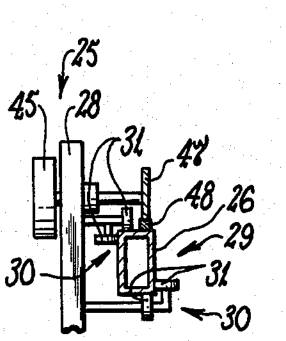
FIG. 6 is a detailed partial end elevational view of the apparatus of FIG. 2.
Figure 8:
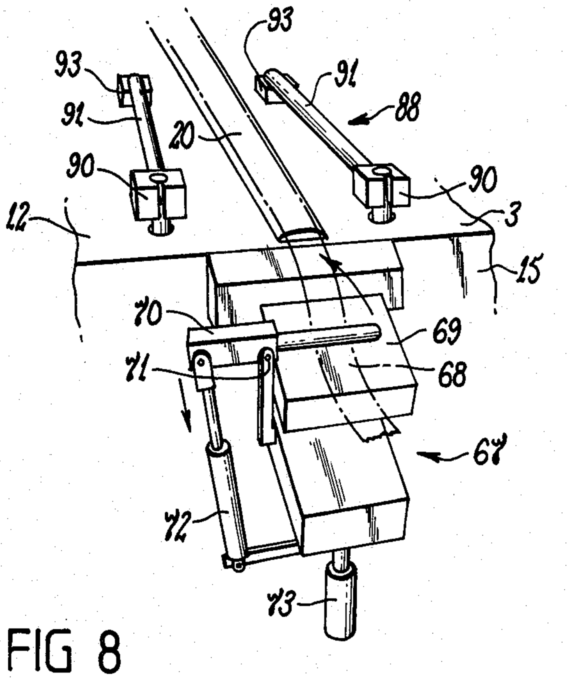
FIG. 8 is a detailed partial perspective view of the apparatus of FIG. 2.

As best shown in FIG. 7, each locating shoulder 16, is formed from a strip of material, substantially L-shaped in cross-section. In that regard, one arm 17, forms an abutment plate for a longitudinal edge of strip member 10, and other arm 18, a base plate by which the abutment plate may be attached to work surface 12, with fastening means such as bolts 19.

Work surface 12, also includes at least one rib 20, formed thereon, extending between head and tail ends 13,14, and, intermediate locating shoulders 16. Rib 20, is provided so that edge portions 11, of strip member 10, are raised above the plane of the remainder of their respective strip members 10. In that way, edge portions 11, are prominently presented for adhering of tape thereto, as will be more fully described hereinafter. Rib 20, is convexly curved and may have a sand-blasted finish to facilitate gripping of the tail thereto.

Carriage 25, is mounted for linear movement over work surface 12. Carriage 25, is mounted above work surface 12, for movement along carriage track 26. Carriage track 26, is arranged so that carriage 25, may be conveyed between the head and tail ends 13,14, parallel to rib 20. As will be more apparent hereinafter, carriage track 26, permits carriage 25, to move between extreme ends of travel which are beyond head and tail ends 13,14. Carriage track 26, is rail-like and supported by support posts 27, (only one of which is shown) extending from work table 15.

Carriage 25, includes frame 28, connected to trolley 29, which is mounted for movement along track 26. Frame 28, is substantially plate-like and extends between track 26, and work surface 12. Trolley 29, includes chassis 30, connected to carriage frame 28, and a plurality of rolling members 31, rotatably mounted on chassis 30, and in engagement with track 26. Rolling members 31, are arranged so as to provide stabilised movement of carriage 25, along track 26, and to prevent carriage 25, from inadvertently disengaging therefrom. That is achieved by locating rolling members 31, in rolling engagement with all four sides of track 26, thereby capturing track 26, therebetween. As shown, two rolling members 31, engage each side of track 26, rolling members 31, being grouped adjacent two diagonally opposed longitudinal edges of track 26.

Figure 4:
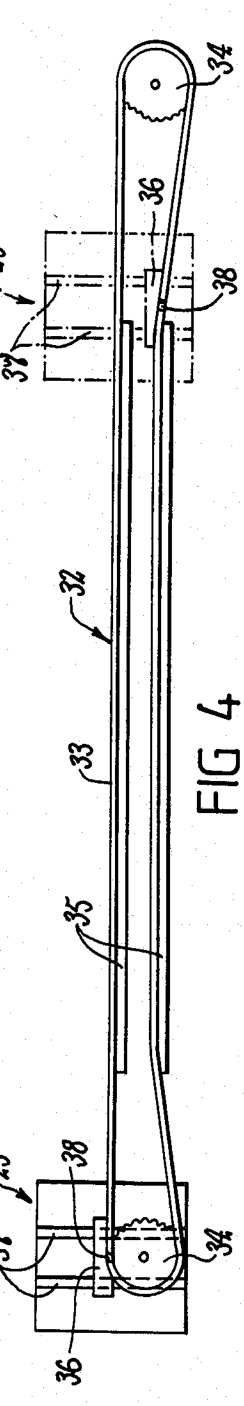
FIG. 4 is a partial rear elevational view of the apparatus of FIG. 2.

Carriage 25, is driven along carriage track 26, between the head and tail ends 13,14, of work surface 12. That is achieved by drive means 32. As best shown in FIG. 4, drive means 32, includes flexible drive transmission member 33, such as a drive chain. Transmission member 33, is endless, and mounted for movement about a pair of sprockets 34, rotatably mounted in posts 27. One of sprockets 34, is selectively driven to effect movement of transmission 3. An electric motor (not shown) may be used for that purpose. Transmission member 33, is guided between sprockets 34, by guide tracks 35.

Transmission member 33, is connected to frame 28, of carriage 25. That is achieved through sliding block 36, slidably mounted on rods 37, on frame 28, and pivotably connected at 38, to transmission member 33. In that way, movement of transmission member 33, in a single direction can reversibly move carriage 25, along track 26.

A bank of pick up units 39, are mounted on carriage frame 28, for movement therewith and operable to releasably engage and feed strip members 10, from machine FM9, to work surface 12. The arrangement is such that operation of pick up units 39, when carriage 25, is adjacent work surface tail end 14, causes units 39, to pick up a pair of strip members 10, presented by machine FM9, and subsequent movement of carriage 25, back to work surface head end 13, draws picked up strip members 10, onto work surface 12.

Each pick up unit 39, includes a pick up pad 40, presenting an element abutment face 41, to work surface 12. Pick up pads 40, are resiliently mounted on carriage frame 28, and that may be achieved by forming the walls of pads 40, of a resilient concertina-formed tubular material.

Pick up is achieved by selectively creating a vacuum at abutment face 41, of each of pads 40, that vacuum drawing strip members 10, against abutment faces 41. A port (not shown) extending through in each of pads 40, opens onto its respective face 41, and is connected to a vacuum source, such as a vacuum pump.

A supply source 42, of self-adhesive tape 4, is mounted on carriage 25, for movement therewith. That supply source is in the form of a single roll of tape, although a plurality of rolls of tape 4, could be so mounted to enable simultaneous forming of a plurality of pad blocks.

Tape feed means 43, is mounted on carriage 25, and operable to feed tape 4, from supply source 42, and present it to edge portions 11, of strip members 10, positioned on work surface 12, in a substantially relaxed condition and such that a portion of tape 4, overlaps edge portions 11. In this way, buckling of the resulting pad may be minimised. To effect such laying, tape feed means 43, includes tape prestripping means 44, operable to draw tape 4, from tape supply source 42. The rate at which tape 4, is drawn from tape source 42, by prestripping means 44, is faster than the rate at which it is presented to strip members 10, so that a reserve of drawn tape is built up, tape within the reserve having time to relax prior to its presentation to strip members 10.

The prestripping means 44, includes draw roller 45, for drawing tape 4, from supply source 42. Draw roller 45, is driven by mechanical drive means 46, selectively engageable and derived from movement of carriage 25. Draw roller drive means 46, is a rack and pinion type drive, the pinion being toothed wheel 47, drivingly connected to draw roller 45, and the rack being chain 48, tautly fixed to track 26. With that arrangement, during engagement of wheel 47, and chain 48, and movement of carriage 25, toothed wheel 47, will rotate. That rotation is transmitted to draw roller 45, via an intermediary one way clutch (not shown) so that only movement of carriage 25, in one direction will cause tape 4, to be drawn from supply source 42. That direction is when carriage 25, is moving from head end 13, to tail end 14, of work surface 12.

Drive means 46, operates to drive draw roller 45, for only a portion of the movement of carriage 25, from head end 13, to tail end 14, thereby enabling reserve tape drawn from tape supply source 42, by draw roller 45, to be reduced. That portion extends from head end 13, to adjacent but short of tail end 14. Wheel 47, and chain 48, disengages during the remaining portion of carriage movement to tail end 14, and that is achieved by terminating chain 48, short of tail end 14, so that wheel 47, runs off chain 48.

Tape prestripping means 44, also includes a pair of jockey rollers 49,50, to guide tape 4 from supply source 42, and around draw roller 45, and to maintain a large effective angle of contact between tape 4, and draw roller 45. To enable jockey roller 49, to ride on the ever changing size of supply source 42, that supply source 42, is rotatably mounted on a lever 51, which in turn is pivotally mounted at 52, onto frame 28. A biasing member such as spring 53, acts to bias supply source 42, into engagement with jockey roller 49. Tape feed means 43, further includes tape take up means 54, adapted to store the reserve of tape drawn from prestripping means 44, prior to its presentation to strip members 10.

Take up means 54, includes dancing idler roller 55, which is resiliently biased against the reserve tape thereby being adjustable to the change in the amount of reserve tape. Dancing idler roller 55, is rotatably mounted on lever 56, which in turn is pivotably connected, at 57, to carriage frame 28. Take up means 54, also includes a pair of fixed idler rollers 58, for guiding tape 4, from prestripping means 44, and around dancing idler roller 55.

Tape feed means 43, also includes tape presentation means 59, to present tape 4, issuing from take up means 54, for laying and to prevent tape 4, from straying from adjacent work surface 12. Tape presentation means 59, positions tape 4, immediately above rib 20, on work surface 12, over adjacent edge portions 11, of a pair of strip members 10, positioned on work surface 12. Tape presentation means 59, includes a pair of interengaging idler rollers 60,61, between which tape 4, passes and beneath roller 61, which tape passes to be laid.

Tape applicator means 62, is mounted on carriage frame 28, for laying tape 4, presented to strip members 10. Tape applicator means 62, is a brush-type applicator, i.e., it brushes tape 4, into adhering contact with strip members 10. In that way, stressing and creasing of tape 4, can be minimised during laying. Brush applicator means 62, includes a spatula element 63, which pushes and brushes tape 4, into contact with strip members 10.

Spatula element 63, is mounted on lever member 64, pivotably connected at 65, to carriage frame 28, thereby permitting spatula element 63, to be raised from and lowered toward work surface 12. Spatula element 63, is biased into contact with work surface 12, by biasing spring 65. An actuator element 66, is connected to lever member 64, to controllably pivot spatula element 63, out of contact with work surface 12, against the bias of spring 65.

Machine CM9, further includes releasable tape clamp means 67, for holding leading end portion 68, of tape 4, stationary during laying of tape 4. Clamp means 67, is stationed adjacent head end 13, and includes a pair of relatively movable jaws 69,70, between which tape leading end portion 68, is clamped. Jaw 69, is plate-like, and jaw 70, finger-like, finger jaw 70, being pivotably connected at 71, to plate jaw 69, and is operable by actuator element 72, to descend onto plate jaw 69, to clamp leading end portion 68. Jaws 69,70, are linearly movable in unison between positions above and below the level of work surface 12. In that way, jaws 69,70, can be raised into a position where they can clamp leading end portion 68, protruding from tape presentation means 59, and then lowered clear of carriage 25, during its movement. Actuator 73, may provide that movement.

Tape setting member 74, is provided to assist in having leading end portion 68, clamped between jaws 69,70. Setting member 74, is mounted on carriage frame 28, rearwardly of tape presentation means 59, and is adapted to receive leading end portion 68, protruding therefrom and positions it so that it can be clamped between jaws 69,70, on actuation of those jaws. Setting member 74, draws leading end portion 68, thereagainst which may be achieved by selectively creating a vacuum at face 75, of setting member 74, against which leading end portion 68, is drawn. Port 76, opens into face 75, and is connected to a vacuum source, such as a vacuum pump. Setting member 74, is slotted as at 77, so that finger jaw 70, can enter slot 77, and press leading end portion 68, into plate jaw 69, stationed therebeneath.

Machine CM9, further includes tape severing means operable to sever leading end portion 68, from tape 4, laid on strip members 10, and to sever tape 4, laid on strip members 10, from tape supply source 42.

That severing means preferably includes severing member 79. Severing member 79, includes cutting blade 81, linearly movable at the predetermined time to sever tape 4. Cutting blades 81, have a serrated cutting edge to facilitate severing. Actuator element 82, is connected to blade 81, to effect movement of that blade.

Machine CM9, further includes press element 83, mounted on carriage frame 28, to assist in severing tape 4, laid on strip members 10, from supply source 42. Press element 83, is operable immediately prior to tape severing by severing member 79, to press tape 4, immediately adjacent the line of sever hard onto strip members 10, and they in turn against work surface 12.

Press element 83, includes press roller 84, movable to press tape 4, onto strip members 10. Roller 84, is pivotably connected to carriage frame 28, via, for example, link 85, for movement toward and away from work surface 12. Spring 86, biases roller 84, away from work surface 12, and actuator element 87, is operably connected to link 85, to move roller 84, against bias of spring 86, toward work surface 12.

Machine CM9, further includes releasable clamp means for holding strip members 10, against work surface 12, during tape laying. The clamp means is adapted to slightly tension strip members 10, positioned on work surface 12, thereby to minimise their buckling and movement. The clamp means includes a pair of clamps 88,89, stationed adjacent head and tail ends 13, and 14, respectively of work surface 12. They clamp strip members 10, by pressing their end regions onto work surface 12. Clamp 89, effects strip member tensioning; that is achieved by arranging clamp 89, so that when it is in frictional engagement with strip members 10, it moves in a direction from head end 13, to tail end 14, of work surface 12.

Clamp 88, includes a pair of clamp members 90, each operative to clamp a respective one of a pair of strip members 10, on work surface 12. Each clamp member 90, includes clamp arm 91, one end of which is rigidly connected to actuator element 92, operable for linear movement toward and away from work surface 12. The other end of clamp arm 91, has clamp pad 93, attached thereto for pressing strip members 10, against work surface 12.

Clamp 89, includes a pair of clamp members 94, operative to clamp a respective one of a pair of strip members 10, drawn onto work surface 12. Each clamp member 94, includes clamp arm 95, one end of which is rigidly connected to actuator element 96, operable for linear movement toward and away from work surface 12. Actuator element 96, is in turn connected to actuator element 97, operable to move clamp arm 95, parallel to the plane of work surface 12. The other end of clamp arm 95, has clamp pad 98, attached thereto for pressing strip members 10, against work surface 12.

Actuator elements 66, 72, 73, 82, 87, 92, 96, 97, used to actuate support surface 23, spatula element 63, finger jaw 70, jaws 69,70, cutting blade 81, roller 84, clamp arm 91, and clamp arm 95, respectively are linear actuator elements and may be mechanical actuator elements although it should be appreciated that they may be, for example, electrical actuator elements. Actuator elements 66, 72, 73, 82, 87, 92, 96, 97, may be piston/cylinder actuators. Their actuating fluid may be gas, such as air.

Figure 10:
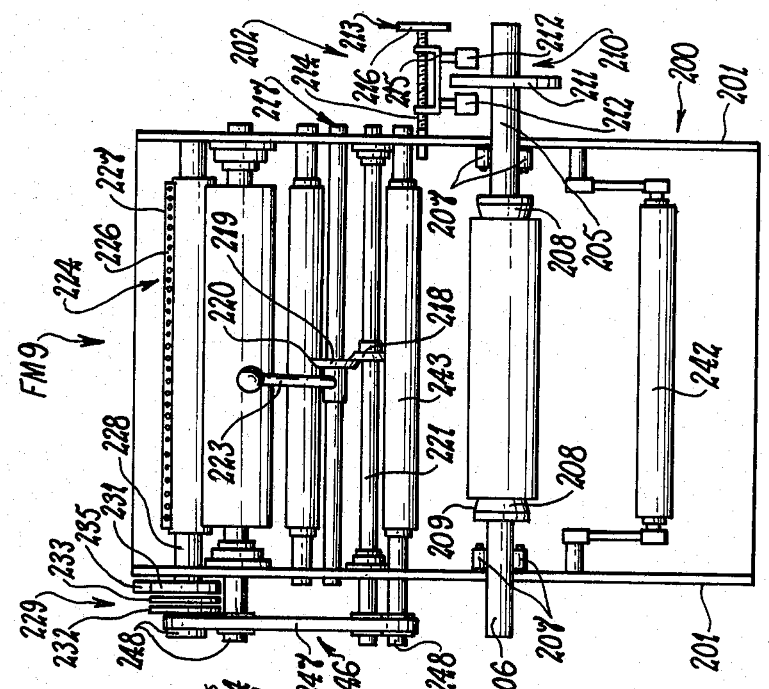
FIG. 10 is a detailed partial end elevational view of the apparatus of FIG. 2; and, FIG. 11 is a control circuit diagram for the apparatus of FIG. 2.
Figure 9:
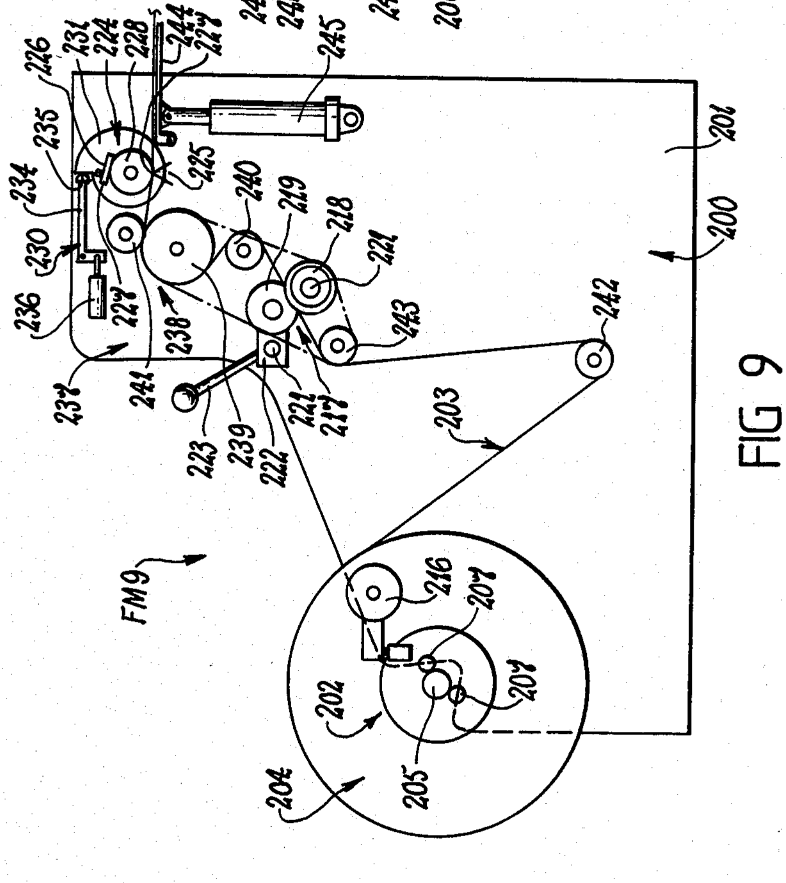
FIG. 9 is a detailed partial side elevational view of the apparatus of FIG. 2.

Referring to FIGS. 9 and 10, machine FM9, is specifically illustrated and includes frame 200, of any construction suitable for support of machine FM9. In that regard, however, frame 200, is so constructed as to permit formed strip members 10, to leave at a level which will allow them to be readily placed for subsequent collation by machine CM9. Frame 200, may sit on a base such as a floor. Frame 200, includes a pair of spaced apart frame members 201, each substantially planar and resting on a base.

Machine FM9 also includes support means 202, on frame 200, for supporting a supply source of elongate material 203, from which strip members are formed. Elongate material 203 is conveniently held in roll form supply source 204, to permit economical use of space in which to store elongate material 203.

Support means 202, has support spindle 205, of which opposite end portions 206, are rotatably supported substantially horizontally between respective frame members 201. Support means 202, also has two pairs of spaced bearing rollers 207, between each pair a respective spindle end portion 206, is cradled for rotation of spindle 205, about its longitudinal axis.

To axially locate elongate material 203, on support spindle 205, and minimise relative axial movement between roll 204, and spindle 205, support means 202, also has a pair of retention collars 208, removably mounted on spindle 205. Each collar 208, has tapering abutment face 209, arranged to partially enter an axial bore of material roll 204, and engage therewith so that roll 204, rotates in unison with support spindle 205.

Support means 202, also has brake mechanism 210, for regulating rotation of spindle 205 and thus material roll 204. Brake mechanism 210, is of a disc brake construction and includes disc 211, rigidly mounted on support spindle 205, and a pair of brake shoes 212, between which disc 211, rotates. Brake shoes 212, are movable toward and away from each other to respectively frictionally engage and disengage disc 211, and thus adjust the drag force applied to support spindle 205. Movement of brake shoes 212, may be controlled by any suitable arrangement (not illustrated) such as by application of pneumatic or hydraulic fluid pressure to shoes 212.

Support means 202, also has adjustment mechanism 213, operable to axially move support spindle 205, and thus material roll 204, thereon. Adjustment mechanism 213, includes adjustment screw 214, rotatably mounted on one frame member 201, and connecting carriage 215, mounted on screw 214, for linear movement therealong in response to rotation of screw 214. The direction of linear movement of carriage 215, will depend upon the direction of manual rotation of screw 214. Connecting carriage 215, straddles disc 211, and carries brake shoes 212, for movement therewith. In this way, movement of connecting carriage 215, along adjustment screw 214, causes brake shoes 212, to shift disc 211, and thus support spindle 205, axially therewith. Adjustment screw 214, is manually rotatable by means of handle 216.

Machine FM9, also includes longitudinal cutting means 217, for progressively longitudinally cutting elongate material 203, into material strips. Cutting means 217, has a pair of longitudinal cutting blades 218,219, that cooperate with each other to progressively cut elongate material 203, passing therebetween. Cutting blades 218,219, are disc-shaped with peripheral cutting edges 220, arranged so as to generally overlap each other as illustrated.

Cutting means 217, also has separate mounting shafts 221, by which each cutting blade 218,219, is respectively located between frame members 201. Cutting blade 218, is rigidly mounted coaxially on its respective shaft 221, which in turn is rotatably mounted between frame members 201. Cutting blade 219, is freely rotatably mounted on pivot arm 222, which in turn is rigidly mounted on its respective support shaft 221. That shaft 221, is mounted between frame members 201, for limited pivotal movement. In this way, cutting blade 219, can be selectively pivoted away from cutting blade 218, upon pivoting of pivot arm 222, to allow elongate material 203, to be inserted between and removed from between cutting blades 218,219. Lever 223, is conveniently connected on pivot arm 222, to facilitate manual pivoting of cutting blade 219.

Machine FM9, also includes transverse cutting means 224, for intermittently transversely cutting elongate material 203. Transverse cutting means 224, has a pair of transverse cutting blades 225,226, arranged so that elongate material 203, passes therebetween with blades 225,226, intermittently operating to cut that material 203.

Transverse cutting blades 225,226, are elongate so as to extend across the width of elongate material 203, and each has transverse cutting edge 227. Cutting blade 225, is fixed between frame members 201, whilst cutting blade 226, is secured on drive shaft 228, mounted between frame members 201, for rotation about a longitudinal axis. This rotation of drive shaft 228, moves cutting edge 227, of blade 226, intermittently toward and then away from cutting edge 227, of fixed cutting blade 225.

Rotation of cutting blade 226, is intermittent and, to that end, transverse cutting means 224, includes clutch mechanism 229, interconnecting drive shaft 228, and rotary drive means (described hereinafter) together with clutch actuator 230, operable to selectively permit and prevent transmission of drive power from the drive means through clutch mechanism 229, to drive shaft 228, and thus cutting blade 226.

Clutch mechanism 229, includes a pair of clutch plates 231,232, arranged in parallel, coaxial relation, clutch plate 231, being rigidly connected to one end of drive shaft 228, for rotation therewith, and clutch plate 232, connected to the drive means for rotation thereby. Clutch plates 231,232, frictionally interengage in face to face relation, indirectly through intermediate wear plate 233. Thus, unless the frictional force of interengagement is overcome, clutch plates 231,232, rotate together so that drive power from the drive means is transmitted through clutch plates 231,232, to drive shaft 228, and then to cutting blade 226.

Clutch actuator 230, is operable to overcome that frictional force between clutch plates 231,232, and prevent drive power transmission. Clutch actuator 230, includes arm 234, mounted on one frame member 201, for pivotal movement between positions where it engages and disengages abutment stop 235, on clutch plate 231. On engagement, clutch plate 231, is prevented from rotating, and upon disengagement clutch plate 231, is permitted to rotate with clutch plate 232. Actuator arm 234, will normally engage abutment stop 235, so that clutch plates 231,232, will slip relative to each other and prevent rotation of cutting blade 226. However, intermittently, actuator arm 234, will temporarily disengage abutment stop 235, permitting a single unitary rotation of clutch plates 231,232, and thus rotation of cutting blade 226, to transversely cut elongate material 203, with cutting blade 225.

Clutch actuator 230, also includes linear actuator element 236, connected to actuator arm 234, to pivot same. Actuator element 236, may be a piston-and-cylinder actuator, one of the piston-and- cylinder being connected to actuator arm 234, and the other being connected to one of the frame members 201.

Machine FM9, includes feed means 237, for feeding elongate material 203, between frame members 201, along a feed path (as outlined by elongate material 203, in FIG. 9) extending from supply source 204, through longitudinal cutting means 217, and transverse cutting means 224. Feed means 237, includes a set of draw rollers 238, each extending between frame members 201, and arranged so that elongate material 203, passes thereabout in frictional contact. The set of draw rollers 238, includes drive roller 239, which does the actual drawing of elongate material 203, by frictionally gripping that material. Drive roller 239, has an outer peripheral surface which facilitates that frictional grip, and that may be achieved by coating or covering the surface with a high friction material, such as rubber. Also included within the set of draw rollers 238, is a pair of idler rollers 240,241. Idler roller 240, is stationed downstream of drive roller 239, and spaced therefrom whilst idler roller 241, is upstream of drive roller 239, and in running contact therewith.

Feed means 237, also includes guide rollers 242,243, stationed between the elongate supply source 204, and longitudinal cutting means 217. Guide rollers 242,243, are mounted between frame members 201, with guide roller 242, being a jockey roller pivotable to take up any slack in elongate material 203.

Feed means 237, also includes presentation plate 244, over which material strip members 10, slide after passing through transverse cutting means 224, to leave machine FM9, on their way to machine CM9. Presentation plate 244, extends between frame members 201. Moreover, plate 244, may extend generally horizontally but be movable relative to frame 200, to facilitate discharge of material strip members 10. In that regard, presentation plate 244, may be mounted for pivotal movement to present strip members 10, for transfer to machine CM9. Pivotal movement of presentation plate 244, is achieved by linear actuator 245, mounted between plate 244, and one frame member 201.

Machine FM9, also includes drive means 246, for rotating longitudinal cutting blade 218, transverse cutting blade 226, and drive roller 239. Drive means 246, includes a drive motor, such as an electrically driven motor (not illustrated), coupled to cutting blades 218, 226, and drive roller 239, by appropriate transmission train such as belt 247, and pulleys 248.

Although not illustrated, drive means 246, may also include an electronic control circuit operable to measure a predetermined length or other amount of elongate material 203, passing through transverse cutting means 224, and out of machine FM9, and, when that length has been measured, to signal actuator 236, to operate to permit transverse cutting means 224, to transversely cut material 203, and momentarily thereafter signal the electric motor to stop. The control circuit may also include control elements which allow independent operation of the drive motor and movable transverse cutting blade 226.

The control circuit may include a photo relay controller operable to count a predetermined number of revolutions of drive roller 239, pushing material 203, through transverse cutting means 224, which revolutions can be related to the length of material 203. A photoelectric cell may be connected to the photo relay controller to pick up the revolutions of drive roller 239, and signal them to the controller. In addition or alternatively, the control circuit may include a photo relay controller operable to count a predetermined number of indices appearing on elongate material 203, as it moves along, which indices can be related to the amount of drawn material. Again, a photoelectric cell may be connected to the photo relay controller to pick up the indices and signal them to the controller.

Figure 11:
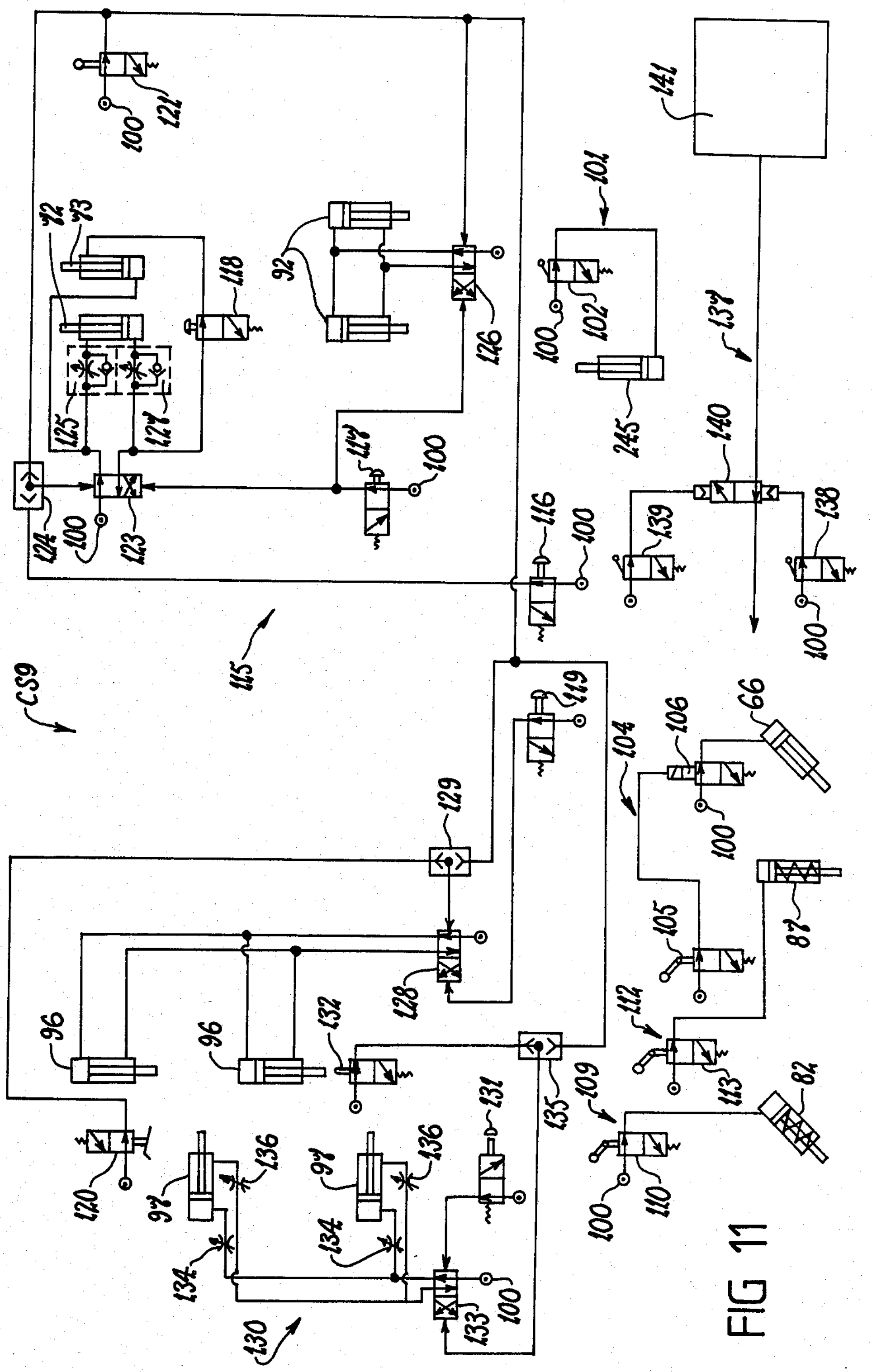

Turning to FIG. 11, there is generally shown control circuit CC9, for the control of actuator elements 66, 72, 73, 82, 87, 92, 96, 97, 224. Actuating fluid is supplied to circuit CC9 from a fluid supply source 100, such as a fluid pump. Control of the actuating fluid to and from actuator elements 66, 72, 73, 82, 87, 92, 96, 97, 245, is by valve means. That valve means is operated manually although it is preferred that at least some of them be operated automatically on movement on carriage 25, along track 26.

Referrring to sub-circuit 101, actuator element 245, is single acting by fluid from supply source 100, to raise presentation plate 244. Trigger valve 102, controls fluid to actuator element 245, and is mounted on carriage track 26, to be triggered by cam 103, mounted on carriage frame 28, into its position shown to interconnect supply source 100, and actuator element 245. Interconnection only occurs during engagement of valve 102, and cam 103, and on disengagement supply source 100, and actuator element 245, disconnect and actuator element 245, is connected to atmosphere whereby presentation plate 244, is lowered under its own weight.

Referring to sub-circuit 104, actuator element 66, is single acting by fluid controlled by trigger valve 105, and transfer valve 106, to raise spatula element 63. Valve 105, is mounted on carriage frame 28, and is triggered by cams 107,108, mounted on carriage track 26. Trigger valve 105, interconnects supply source 100, and transfer valve 106, only during engagement of trigger valve 105, and cam 107, or 108. The arrangement is such that on engagement of trigger valve 105, and cam 107, fluid from supply source 100, acts on transfer valve 106, to move it into and hold it in a first position where fluid from supply source 100, is blocked and actuator element 66, connected to atmosphere to lower spatula element 63, under bias of spring 65, and that on engagement of trigger valve 105, and cam 108, fluid from supply source 100, acts on transfer valve 106, to move it into and hold it in a second position where actuator element 66, is connected to supply source 100, permitting raising of spatula element 63.

Sub-circuit 109, shows actuator element 82, as single acting by fluid, and controlled by trigger valve 110, on carriage frame 28, and triggered by cam 111, on carriage track 26. Trigger valve 110, interconnects supply source 100, and actuator element 82, only during engagement of trigger valve 110, and cam 111, to effect cutting of tape 4, with severing member 79, disengagement connecting actuator element 82, to atmosphere permitting retraction of severing member 79, under action of actuator element return spring.

Sub-circuit 112, is similar in structure and operation to sub-circuit 109. Sub-circuit 112, includes trigger valve 113, on carriage frame 28, and triggered by cam 114, on carriage track 26.

Sub-circuit 115, includes manually operated valves 116, 117, 118, 119, 120, mounted in any convenient position on machine CM9, such as adjacent work surface 12. Sub-circuit 115, also includes trigger valve 121, on carriage track 26, and triggered by cam 112, on carriage frame 28.

Manually operated valve 116, is operable to interconnect supply source 100, to directional valve 123, via one-way valve 124. Directional valve 123, in turn is operable to interconnect supply source 100, to double-acting actuator element 73, to raise finger jaw 70, and plate jaw 69, in unison. Simultaneously, directional valve 123, interconnects supply source 100, to double-acting actuator element 72, through time delay valve 125, to raise finger jaw 70, from plate jaw 69.

Manually operated valve 117, is operable to interconnect supply source 100, to directional valves 123, and 126. Directional valve 123, in turn interconnects supply source 100, to actuator element 72, through time delay valve 127, to lower finger jaw 70, onto plate jaw 69. Simultaneously, directional valve 123, connects supply source 100, to manually operated valve 118, which when operated connects to actuator element 73, to effect lowering of plate jaw 69, and finger jaw 70, in unison.

Operation of valve 117, also connects supply source 100, to double-acting actuator elements 92, through directional valve 126, to effect lowering of clamp arms 91.

Manually operated valve 119, is operable to interconnect supply source 100, to directional valve 128. Directional valve 128, in turn interconnects supply source 100, with double-acting actuator elements 96, to effect lowering of clamp arms 95, toward work surface 12.

Manually operated valve 120, is operable to interconnect supply source 100, to directional valve 128, via one-way valve 129. Directional valve 128, in turn interconnects supply source 100, with actuator element 96, to effect raising of clamp arms 95, away from work surface 12.

Trigger valve 121, is operable on engagement with cam 122, to interconnect supply source 100, with directional valves 123, 126, and 128, and sub-circuit 130, to effect raising of finger jaw 70, away from plate jaw 69, to raise finger jaw 70, and plate jaw 69, in unison; to effect raising of clamp arms 91; and to effect raising and retraction of clamp arms 95, respectively.

Sub-circuit 130, includes manually operated valves 131, and 132. Valve 131, is operable to interconnect supply source 100, with directional valve 133, which in turn interconnects supply source 100, with double-acting actuator elements 97, through restrictors 134, to effect movement of clamp arms 95, to tension strip members 10. Valve 132, is operable through one-way valve 135, to interconnect supply source 100, with direction valve 133, which in turn interconnect supply source 100, with actuator elements 97, through restrictors 136, to reverse actuator element movement.

Sub-circuit 137, includes trigger valves 138, and 139, on carriage track 26, triggered respectively by cams 103, and 122, on carriage frame 28. Valve 138, is operable to interconnect supply source 100, to a directional valve 140, which in turn interconnects pick up units 39, with a supply source of vacuum 140. Valve 138, is operable to interconnect supply source 100, to valve 139, which in turn disconnects pick up units 39, from vacuum supply source 141.

In forming pads 1, with apparatus 9, carriage 25, is initially stationed adjacent work surface head end 13, with tape leading end portion 68, of tape 4, protruding from tape presentation means 59, and drawn by vacuum against setting member 74. In machine CM9, tape cutting blade 81, press element 83, spatula element 63, plate and finger jaws 69,70, are retracted; strip element clamps 88,89, are raised; draw roller 45, stationary element pick up units 39, not connected to vacuum supply source 140; plate and finger jaws 69,70, closed; and strip element support surface 23, is in its lower position.

With machine FM9, not working and longitudinal cutting blade 219, pivoted away from cutting blade 218, support spindle 205, is removed from bearings 207, and one retention collar 208, removed from spindle 205. A roll of elongate material 203, is slid onto spindle 205, the retention collar 208, replaced and spindle 205, repositioned in bearings 207. Retention collars 208, are moved into firm engagement with elongate material roll 204, to secure roll 204, to spindle 205.

A free end of elongate material 203, is then manually drawn through machine FM9, along its feed path by feeding around guide rollers 242,243, through between longitudinal cutting blades 218,219,, around idler roller 240, drive roller 239, and idler roller 241, through between transverse cutting blades 225,226, and over presentation plate 244.

Longitudinal cutting blade 219, is then pivoted back toward cutting blade 218, and drive means 246, initiated to cause drive roller 239, to commence drawing of elongate material 203. Immediately on drawing commencement, adjustment screw 214, is manually rotated to cause axial movement of support spindle 205, so as to align elongate material 203, with longitudinal cutting blades 218,219. Brake mechanism 210, is then adjusted so that elongate material 203, is drawn from supply source roll 204, at a rate at which it can be fed through machine FM9.

Once elongate material 203, passing through machine FM9, is being longitudinally cut correctly, drive means 246, can be stopped and transverse cutting blades 225,226, caused to cut elongate material 203. The cut material is discarded and the machine FM9, is now set up and ready to form strip members 10, for machine CM9.

A pad block backing member 7, is then manually laid in position on work surface 12, and valves 117, 119, and 131, sequentially operated to clamp backing member 7, to work surface 12, and tension backing member 7, clamped thereon. Valve 117, also operates to lower finger jaw 70, to effect clamping of leading end portion 68, and on manual actuation of valve 118, plate jaw 69, and finger jaw 70, are lowered in unison.

The drive of carriage 25, is then manually actuated to commence movement of carriage 25, toward work surface tail end 14. Movement of carriage 25, immediately causes chain 48, to rotate toothed wheel 47, which in turn rotates draw roller 45, to draw tape 4, from supply source 42, and supply it to tape presentation means 59. Leaving work surface head end 13, tape presentation means 59, positions tape 4, above backing member 7, and directly over rib 20.

Thereafter cam 107, triggers valve 105, to cause lowering of spatula element 63, so that as soon as it reaches head end 13, it commences brushing tape 4, onto backing member 7. Carriage 25, continues along track 26, tape 4, being brushed onto backing member 7. As previously explained, draw roller 45, draws tape 4, at a rate faster than the rate at which it is laid on backing member 7, so causing dancing idler roller 55, to slowly drop pivoting 57, to remove slack from drawn tape.

As carriage 25, approaches tail end 14, toothed wheel 47, runs off chain 48, ceasing drive to draw roller 45, so causing tape 4, in reserve to be used thus reducing reserve of tape and raising dancing idler roller 55. Cam 114, then triggers valve 113, to lower press roller 84, pressing tape 4, onto backing member 7. Carriage 25, reaches tail end 14, whereupon cam 111, triggers valve 110, to lower cutting blade 81, to sever tape laid on backing member 7, from tape supply source 42, following which blade 81, is retracted. The freshly formed leading end portion 68, of tape 4, is immediately drawn against setting member 74.

Carriage 25, continues its travel, now beyond tail end 14, to machine FM9, press roller 84, and spatula element 63, completing laying of tape 4, previously presented. Cam 108, then triggers valve 105, to cause spatula element to be raised.

Machine FM9, then immediately commences operation, with drive roller 239, drawing elongate material 203, through longitudinal cutting blades 218,219, to progressively cut material 203, into a pair of strips. Those strips of material 203, are fed through transverse cutting blades 225,226, over presentation plate to pick up units 39. Cam 103, triggers valves 138, and then 102, to connect pick up units 39, with vacuum supply source 141, and to raise presentation plate 244, respectively. This causes the longitudinal strips of elongate material 203, to be drawn up and held against a respective pick up unit 39.

Carriage 25, then commences its return movement toward head end 13, drawing strips of elongate material 203, onto work surface 12. Reversal of carriage 25, causes cam 103, to disengage from valve 102, causing presentation plate 244, to lower, trigger valve 110, to override cam 111, and cam 114, to disengage from valve 113, to raise press roller 84.

This return movement of carriage 25, is coordinated with operation of machine FM9, so that a pair of strip members 10, are formed at about the same rate of for about the same time duration as that return movement. Thus, upon a predetermined length of material strips passing transverse cutting blades 225,226, actuator 236, disengages actuator arm 234, from abutment stop 235, to permit unitary rotation of clutch plates 231,232. This in turn causes transverse cutting blade 226, to rotate and with cutting blade 225, transversely cut elongate material 203. A pair of strip members 10, are thus formed.

As carriage approaches head end 13, trigger valve 105, overrides cam 107, and cam 122, triggers valve 139, causing disconnection of vacuum supply source 141, to pick up units 39, whereupon strip members 10, held thereby fall to work surface 12, superimposed on backing member 7. Cam 122, then triggers valve 121, to raise clamps 88, and 89, and retract clamp 89, unclamping backing member 7. Triggering valve 121, also raises finger jaw 70, from plate jaw 69, and raises finger jaw 70, and plate jaw 69, in unison.

Thereafter, carriage 25, returns to its starting position adjacent head end 13, whereupon the carriage drive is automatically ceased. That may be achieved in any known manner such as carriage 25, tripping a drive cut-off switch (not shown). Upon visual inspection, and if necessary, realignment of strip members 10, drawn onto work surface 12, the above procedure commencing with actuation of valve 117, may be repeated, building the pad block up pairs of strip members 10, upon pairs of strip members 10. Once the pad block has been compiled it may be removed from machine CM9, for cutting along the longitudinal axis of the self-adhesive tape 4, and transversely across the strip members 10, to form pads 1.

It will also be appreciated that the method and apparatus of the present invention has an advantage of substantially automatically forming uniform discrete length strip members from a supply source of elongate material. In addition, the apparatus in its preferred form, can operate rapidly. As a result, production of strip members, and from those pads, can be rapid, and economical. The preferred method of forming the pads involves a minimum of human labour. As such, the costs of manufacture may be minimised.

Finally, it is to be understood that various modifications and/or alterations may be made without departing from the ambit of the present invention as defined in the claims appended hereto.

Having now described my invention what I claim as new and desire to secure by Letters Patent is:

1. A method for forming discrete length strip members each composed of a plurality of laterally interconnected items, and collating the strip members into a plurality of pads of items, comprising:

feeding elongate material from a supply source along a feed path past longitudinal cutting means and transverse cutting means;

progressively longitudinally cutting the passing elongate material into a plurality of material strips with the longitudinal cutting means;

intermittently transversely cutting the passing elongate material strips with the transverse cutting means thereby to form the strip members;

intermittently feeding the strip members onto a work surface, each feeding positioning at least one strip member onto the work surface, and the or each strip member of each successive feeding being superimposed on the or a respective strip member of the immediately preceding feeding;

and, subsequent to each feeding:

(i) feeding self-adhesive tape from a tape supply source;

(ii) substantially relaxing tape fed from the tape supply source;

(iii) presenting the relaxed tape to an edge portion of the or each strip member positioned on the work surface, during the immediately preceding feeding, such that a portion of the relaxed tape overlaps the edge portion of the or each strip member; and, (iv) laying the presented tape on the edge portion of the or each strip member so that the presented tape adheres thereto, the laterally overlapping portion of the presented tape laid on successive strip members adhering to the overlapping portion of tape laid on the immediately preceding strip member thereby to interconnect adjacent superimposed strip members.

2. A method as claimed in claim 1, wherein the supply source of elongate material is held in roll form and the elongate material is progressively unrolled therefrom during feeding along the feed path.

3. A method as claimed in claim 2, wherein the supply source of elongate material is rotated about a central axis during unrolling of the elongate material, and the supply source is axially movable to shift the supply source for alignment of the elongate material with the cutting means for correct cutting.

4. A method as claimed in claim 3, wherein rotation of the supply source of elongate material is regulated thereby to control the rate of unrolling of the elongate material.

5. A method as claimed in claim 1, wherein the longitudinal cutting of the elongate material includes passing the material between at least one pair of cutting elements, included in the longitudinal cutting means, the longitudinal cutting elements continuously cooperating with each other to progressively cut the elongate material into the plurality of material strips.

6. A method as claimed in claim 5, wherein longitudinal cutting of the elongate material includes cutting the elongate material in a shearing like action with the longitudinal cutting elements.

7. A method as claimed in claim 6, wherein each longitudinal cutting element is a disc-shaped cutting blade having a peripheral cutting edge, and longitudinal cutting of the elongate material includes drive rotating at least one of the longitudinal cutting blades as the elongate material is passed between the cutting edges.

8. A method as claimed in claim 1, wherein transverse cutting of the elongate material includes passing the elongate material strips between a pair of transverse cutting elements, included in the transverse cutting means, the transverse cutting elements intermittently cooperating with each other to intermittently cut the material strips.

9. A method as claimed in claim 8, wherein transverse cutting of the elongate material strips includes intermittently moving at least one of the transverse cutting blades relative to the elongate material strips toward and away from the other transverse cutting blade to, respectively, transversely cut the elongate material strips between the transverse cutting elements, and allow the material strips to freely pass therebetween.

10. A method as claimed in claim 8, wherein transverse cutting of the elongate material includes simultaneously cutting across the entire width of the elongate material strips with the transverse cutting elements.

11. A method as claimed in claim 8, wherein each transverse cutting element is a transverse cutting blade with an elongate linear cutting edge, and transverse cutting of the elongate material strips includes holding one transverse cutting blade stationary and intermittently rotating the other cutting edge thereof toward and away from the cutting edge of the fixed transverse cutting blade.

12. A method as claimed in claim 1, wherein feeding of the elongate material includes drawing the material from the supply source and through the longitudinal cutting means, and then pushing the elongate material strips through the transverse cutting means.

13. A method as claimed in claim 12, wherein feeding of the elongate material includes frictionally contacting the material with a set of draw rollers and rotatably driving at least one of the draw rollers to draw the elongate material and push the material strips through the cutting means.

14. A method as claimed in claim 1, wherein feeding of the elongate material includes guiding the material through the cutting means.

15. A method as claimed in claim 14, wherein guiding the elongate material includes frictionally contacting the material with at least one guide roller which correctly aligns the material with the longitudinal cutting means.

16. A method as claimed in claim 1, wherein the relaxed tape is presented to an edge portion of the or each strip member positioned on the work surface such that, when laid, the tape extends along and laterally overlaps the edge portion of the or each strip member along the entire length of the edge portion thereof.

17. A method as claimed in claim 16 wherein the relaxd tape is progressively presented to and laid along the edge portion of the or each strip member from one end to the other end thereof.

18. A method as claimed in claim 17, wherein tape is fed from the tape supply source and relaxed substantially continuously during presentation and laying thereof.

19. A method as claimed in claim 18 wherein tape is fed from the tape supply source by drawing tape therefrom, and the fed tape is relaxed by drawing it from the tape supply source at a rate which is faster than that at which it is presented to the edge portion of the or each strip member for laying thereby creating a reserve of drawn tape, tape in the reserve of drawn tape having time to substantially relax prior to being presented for laying.

20. A method as claimed in claim 19, and further including ceasing drawing of tape from the tape supply source prior to completion of tape laying along the edge portion of the or each strip member, completion of tape laying reducing the reserve of drawn tape.

21. A method as claimed in claim 1, wherein each strip member feeding positions at least one pair of strip members on the work surface, the strip members of the or each pair being positioned with their respective edge portions parallel to and closely spaced apart from each other, and wherein the relaxed tape is presented such that it extends between the edge portions of the or each pair of strip members, whereby, on laying, the presented tape interconnects the strip members of the or each pair positioned on the work surface during the immediately preceding strip member feeding thereby to substantially simultaneously form a plurality of integrally connected pads.

22. A method as claimed in claim 21, and further including longitudinally severing the laid tape intermediate the edge portions of the or each pair of strip members thereby separating the pairs of strip members.

23. A method as claimed in claim 1, and further including separating the superimposed and laterally interconnected items into a plurality of separate pads.

24. A method as claimed in claim 1, wherein the presented tape is laid on the edge portion of the or each strip member by brushing the tape thereon.

25. A method as claimed in claim 1, and further including subsequent to each strip member feeding, releasably fixing strip members positioned on the work surface thereto during laying of the presented tape, the strip members being slightly tensioned on fixing thereby to minimise undesired movement thereof.

26. A method as claimed in claim 17, wherein the tape fed from the tape supply source has a leading end portion, and further including subsequent to each strip member feeding, fixing the leading end portion prior to laying the presented tape, relative to the strip members, the relaxed tape being progressively presented and laid in a direction leading away from the fixed leading end portion.

27. A method as claimed in claim 26, wherein the leading end portion is fixed remote from the strip members, and further including severing the leading end portion from the tape laid on the strip members.

28. A method as claimed in claim 27, and further including subsequent to each tape laying, severing the laid tape from the tape supply source thereby forming a fresh leading end portion on the tape fed from the tape supply source.

29. A method as claimed in claim 1, and further including prior to feeding strip members onto the work surface, feeding at least one backing member from a backing member supply source onto the work surface, feeding tape from the tape supply source, substantially relaxing tape fed from the tape supply source, presenting the relaxed tape to an edge portion of the or each backing member positioned on the work surface and laying the presented tape along the edge portion of the or each backing member, the strip members subsequently fed onto the work surface being superimposed on the backing member with the overlapping portion of tape laid on the or each strip member immediately succeeding the or each backing member adhering to the tape laid on the or each backing member.

30. Apparatus for forming discrete length strip members each composed of a plurality of laterally interconnected items, and collating the strip members into a plurality of pads of items, comprising:

- support means for a supply source of elongate material from which the strip members are formed;
- longitudinal cutting means operable to progressively longitudinally cut the elongate material into a plurality of material strips;
- transverse cutting means operable to intermittently transversely cut the elongate material strips thereby to form the strip members;
- feed means for feeding the elongate material longitudinally from the supply source along a feed path passing the longitudinal cutting means for cutting into material strips, and passing the transverse cutting means for cutting the material strips into the strip members;
- a work surface for receiving strip members thereon;
- strip member feed means for intermittently feeding strip members onto the work surface, each strip member feeding positioning at least one strip member onto the work surface, and the or each strip member of each successive feeding being superimposed on the or a respective strip member of the immediately preceding feeding;
- a carriage mounted for linear movement over the work surface, the carriage movable subsequent to each strip member feeding in a direction parallel to an edge portion of the or each strip member positioned on the work surface;
- a supply source of self-adhesive tape mounted on the carriage;
- tape feed means mounted on the carriage and operable during carriage movement subsequent to each strip member feeding to feed self-adhesive tape from the tape supply source and present it to the edge portion of the or each strip member, positioned on the work surface during the immediately preceding strip member feeding, in a substantially relaxed condition and such that a portion of the tape overlaps the edge portion of the or each strip member; and,
- tape applicator means mounted on the carriage for laying the presented tape on the edge portion of the or each strip member so that the tape adheres thereto, the overlapping portion of tape laid on successive strip members adhering to the laterally overlapping portion of tape laid on the immediately preceding strip member thereby to interconnect adjacent superimposed strip members.

31. Apparatus as claimed in claim 30, wherein the support means includes an elongate support member mounted for free rotation about a longitudinal axis, the support member being arranged to hold a roll form supply source of elongate material for unrolling during feeding to the cutting means.

32. Apparatus as claimed in claim 30, wherein the support means includes: one or more retention elements for rigidly holding the supply source of elongate material on the support member so that the support member and supply source rotate together during elongate material feeding; and, an adjustment mechanism for axially moving the support member to shift the supply source for alignment of the elongate material with the cutting means.

33. Apparatus as claimed in claim 32, wherein the support means includes a brake mechanism operable to regulate the free rotation of the support member and thereby control the rate of unrolling of the elongate material.

34. Apparatus as claimed in claim 30, wherein the longitudinal cutting means includes at least one pair of longitudinal cutting elements between which the elongate material passes, the longitudinal cutting elements of the or each pair continuously cooperating with each other to progressively cut the elongate material into the plurality of material strips.

35. Apparatus as claimed in claim 34, wherein each longitudinal cutting element is a longitudinal cutting blade with a cutting edge, the longitudinal cutting blades of each pair mounted with the cutting edges generally overlapping so that the elongate material passing therethrough is cut with a shearing like action.

36. Apparatus as claimed in claim 35, wherein each longitudinal cutting blade is disc-shaped with a peripheral cutting edge, and at least one longitudinal cutting blade of the or each pair is mounted for rotation about a central axis.

37. Apparatus as claimed in claim 36, wherein each longitudinal cutting blade is mounted for rotation about a respective central axis, and at least one longitudinal cutting blade of the or each pair is rotatably driven to cut the elongate material.

38. Apparatus as claimed in claim 30, wherein the transverse cutting means includes a pair of transverse cutting elements between which the elongate material strips pass, the transverse cutting elements being intermittently cooperable with each other to cut the material strips.

39. Apparatus as claimed in claim 38, wherein each transverse cutting element is a transverse cutting blade with a cutting edge, at least one of the transverse cutting blades being mounted for movement relative to the elongate material strips toward and away from the other transverse cutting blade to, respectively, transversely cut the elongate material strips between the cutting edges, and allow the material strips to freely pass therebetween.

40. Apparatus as claimed in claim 39, wherein each transverse cutting blade is elongate with an elongate linear cutting edge arranged to extend across the complete width of the elongate material strips, movement of the at least one transverse cutting blade simultaneously cutting across the entire width of elongate material strips passing therebetween.

41. Apparatus as claimed in claim 39, wherein one transverse cutting blade is stationary and the other transverse cutting blade is intermittently rotatable about its longitudinal axis to move the cutting edge thereof toward and away from the cutting edge of the stationary transverse cutting blade.

42. Apparatus as claimed in claim 30, wherein the feed means includes a draw unit stationed between the longitudinal cutting means and the transverse cutting means, and operable to draw feed the elongate material from the supply source and through the longitudinal cutting means and then push feed the material strips through the transverse cutting means.

43. Apparatus as claimed in claim 42, wherein the draw unit includes a set of draw rollers between which the elongate material strips passes in frictional contact, at least one of the draw rollers being rotatably driven.

44. Apparatus as claimed in claim 42, wherein the feed means also includes a guide unit operable to guide the elongate material through the longitudinal and transverse cutting means.

45. Apparatus as claimed in claim 44, wherein the guide unit includes at least one guide roller stationed between the supply source of elongate material and the longitudinal cutting means, the elongate material passing about the or each guide roller in contact therewith to ensure correct alignment of the elongate material with the longitudinal cutting means.

46. Apparatus as claimed in claim 30, wherein the tape feed means progressively presents the tape to, and the tape applicator means progressively lays the tape along, the edge portion of the or each strip member as the carriage moves over the work surface subsequent to each strip member feed.

47. Apparatus as claimed in claim 46, wherein the tape feed means feeds tape from the tape supply source and relaxes the feed tape substantially continuously during presentation and laying of the tape.

48. Apparatus as claimed in claim 47, wherein the tape feed means includes tape prestripping means operable to draw feed tape from the tape supply source at a rate which is faster than that at which it is presented to the strip members, thereby creating a reserve of drawn tape, tape in the reserve of drawn tape substantially relaxing prior to the tape feed means presenting it for laying on the strip members.

49. Apparatus as claimed in claim 48, wherein the tape prestripping means is operable to draw feed tape during a major portion of the carriage movement subsequent to each strip member feed and is inoperable to draw feed tape during the remaining minor portion of the carriage movement subsequent to each strip member feed, the tape feed means during inoperation of the tape prestripping means continuing to present the reserve of tape for laying on the strip members thereby reducing the amount of the reserve of drawn tape.

50. Apparatus as claimed in claim 49, wherein the tape prestripping means includes at least one draw roller operative to draw feed tape from the tape supply source, and the tape feed means also includes take up means having at least one idler roller arranged to supportingly receive tape from the draw roller and about which the reserve of drawn tape is created.

51. Apparatus as claimed in claim 30, wherein the tape feed means includes tape presentation means positioned immediately above the edge portion of the strip members during the carriage movement subsequent to each strip member feed and arranged to receive the substantially relaxed tape and present it to the edge portion of the strip members, such that when laid the tape laterally overlaps the edge portion of the strip members along the entire length of the edge portion of the strip members.

52. Apparatus as claimed in claim 30, wherein the tape applicator means is a brush-type applicator operable to brush the tape presented to the edge portion of the strip members into adherence therewith.

53. Apparatus as claimed in claim 30, wherein the strip member feed means is mounted on the carriage for movement therewith, the carriage being intermittently movable from adjacent the cutting means to the work surface, during which movement said sheet element feed means is operable to releasably engage strip members as they are formed to draw feed the strip members onto the work surface.

54. Apparatus as claimed in claim 53, wherein the strip member feed means includes at least one pair of strip member pick up units operable, at each feed, to simultaneously releasably engage and feed a respective pair of strip members on the work surface, the pick up units positioning the or each pair of-strip members with their respective edge portions parallel to and closely spaced apart from each other, and the tape feed means is operable to present the tape such that it extends between the edge portions of the or each part of strip members whereby, on laying, the presented tape interconnects the strip members of the or each pair positioned on the work surface during the immediately preceding strip member feed thereby to substantially simultaneously form a plurality of integrally connected pads.

55. Apparatus as claimed in claim 46, wherein the tape fed from the tape supply source has a leading end portion and further including releasable tape clamp means positioned adjacent the work surface and operable, subsequent to each strip member feed, and prior to laying the presented type, to clamp the leading end portion relative to the work surface, the relaxed tape being progressively presented and laid in a direction leading away from said clamped leading end portion.

56. Apparatus as claimed in claim 55, and further including tape severing means operable to sever the leading end portion from tape laid on the strip members and operable to sever the tape laid on the strip members from the tape supply source thereby forming a fresh leading end portion on the tape fed from the tape supply source.

57. Apparatus as claimed in claim 30, and further including releasable strip member clamp means, operable subsequent to each strip member feed to clamp the strip members positioned on the work surface thereto, during laying of the presented tape, the strip member clamp means slightly tensioning the strip members positioned on the work surface thereby to minimise undesired movement thereof.

58. Apparatus as claimed in claim 30, wherein the work surface has at least one rib formed thereon against which the edge portions of the strip members positioned on the work surface abut thereby to raise the edge portions relative to the remainder of the strip members to facilitate laying of the presented tape thereon.

59. Apparatus as claimed in claim 58, wherein the work surface has strip member location means formed thereon for locating the strip members on the work surface such that the edge portions thereof abuts against the rib.

* * * * *

UNITED STATES PATENT AND TRADEMARK OFFICE
CERTIFICATE OF CORRECTION

PATENT NO. : 4,662,970

DATED : May 5, 1987

INVENTOR(S) : PETER BANCROFT

It is certified that error appears in the above-identified patent and that said Letters Patent is hereby corrected as shown below:

Col. 4, line 24, delete "materal" and insert --material--.

Col. 16, line 51, delete "Referrring" and insert --Referring--.

Col. 18, line 51, delete "218,219,," and insert --218,219,"

Col. 22, line 37, delete "relaxd" and insert --relaxed--.

Col. 27, line 1, delete "type" and insert --tape--.

Signed and Sealed this

Tenth Day of November, 1987

*Attest:*

DONALD J. QUIGG

*Attesting Officer*

*Commissioner of Patents and Trademarks*